US007062780B2

(12) United States Patent
Leerssen et al.

(10) Patent No.: US 7,062,780 B2
(45) Date of Patent: Jun. 13, 2006

(54) GRANULAR ACCESS CONTROL OF INTER-PROCESS COMMUNICATIONS IN A COMPARTMENT MODE WORKSTATION LABELED ENVIRONMENT

(75) Inventors: Scott Alan Leerssen, Atlanta, GA (US); Paul Anthony Cooke, Walnut Creek, CA (US); Suresh Ganesh Pai, Doraville, GA (US); Janak Ratilal Desai, Atlanta, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 14 days.

(21) Appl. No.: 10/765,621

(22) Filed: Jan. 27, 2004

(65) Prior Publication Data

US 2004/0187020 A1   Sep. 23, 2004

Related U.S. Application Data

(63) Continuation of application No. 09/418,285, filed on Oct. 14, 1999, now abandoned.

(51) Int. Cl.
*G06F 15/16* (2006.01)
*G06F 17/30* (2006.01)
*G06F 7/04* (2006.01)
*H04L 9/32* (2006.01)

(52) U.S. Cl. .............................. 726/5; 726/30
(58) Field of Classification Search ............... 713/200, 713/201
See application file for complete search history.

(56) References Cited

U.S. PATENT DOCUMENTS

| 5,572,673 | A | * | 11/1996 | Shurts ....................... 713/200 |
| 5,845,068 | A | * | 12/1998 | Winiger ..................... 713/200 |
| 5,903,732 | A | * | 5/1999 | Reed et al. ................. 709/229 |
| 6,292,900 | B1 | * | 9/2001 | Ngo et al. ................... 713/200 |
| 6,490,626 | B1 | * | 12/2002 | Edwards et al. ............ 709/229 |

FOREIGN PATENT DOCUMENTS

EP    0 926 605 A1  *  6/1999

* cited by examiner

Primary Examiner—Gilberto Barron, Jr.
Assistant Examiner—Grigory Gurshman
(74) Attorney, Agent, or Firm—Richard F. Schuette

(57) ABSTRACT

A method and apparatus for maintaining a secure run-time environment in which arbitrary relationships between the subjects and objects of differing sensitivity labels are defined so as to provide for discrete access between arbitrary, normally incomparable sensitivity labels.

33 Claims, 4 Drawing Sheets

GRANULAR ACCESS CONTROL OF INTER-PROCESS COMMUNICATIONS IN A COMPARTMENT MODE WORKSTATION LABELED ENVIRONMENT

CROSS-REFERENCE TO RELATED APPLICATIONS

This application is a continuation of application Ser. No. 09/418,285, entitled "GRANULAR ACCESS CONTROL OF INTER-PROCESS COMMUNICATIONS IN A COMPARTMENT MODE WORKSTATION LABELED ENVIRONMENT", filed Oct. 14, 1999 now abandoned, the disclosure of which is hereby incorporated herein.

FIELD OF THE INVENTION

The present invention relates to a method for maintaining a secure operating system runtime environment and, more particularly, to a secure operating system having defined arbitrary relationships between subjects and objects of different sensitivity labels.

DESCRIPTION OF RELATED ART

A Compartment Mode Workstation (CMW) is a secured operating system that meets specific requirements set forth by the U.S. Government. Mandatory Access Control (MAC) and privileges are two important elements that go into creating a CMW.

MAC is a system-enforced access control mechanism that uses clearances and sensitivity labels to enforce security policy. MAC associates a security level (which may be either a defined clearance or sensitivity label) with every entity (passive and active) on the system. MAC permits read access to other entities at the same or lower security level, but prevents entities from writing to a lower level. In other words, an entity can read and write a subject or object at the same level but can only read an entity at a lower level. An active entity is defined as a subject, for example a process which causes information to flow amongst objects or changes the system state. A passive entity is defined as an object, and is typically "acted" upon. MAC is always enforced and cannot be overridden without privilege.

A CMW keeps track of security levels with clearances. A clearance represents the degree of security with which an entity is entrusted and has two components:

Classification—a hierarchical level of security. When applied to a process, the classification represents a measure of trust; applied to data, it is the degree of protection required by the data.

Compartment—a subdivision of a classification that represents a grouping. Access is generally granted on a need-to-know basis.

A sensitivity label is an ASCII string representation of the classification/compartment combination of an objects security level. All subjects and objects in a CMW system have sensitivity labels. Since a subject is an active entity, it usually causes information to flow amongst objects or changes the system state. An object is generally a passive entity that contains or receives data, such as files, devices, printers, network interfaces, etc.

A CMW mediates all attempted security-related transactions by comparing the subject's sensitivity label with the object's sensitivity label. It permits or disallows the transaction dependent upon which label is dominant. An entity's sensitivity label dominates another if both of the following conditions are met:

1) The classification of the first entity's sensitivity label is equal to or outranks the object's classification.
2) All compartments in the first entity's sensitivity label are included in the second's sensitivity label.

Two labels are equal if they have the same classification and the same set of compartments. If they are equal, they dominate each other—thus access is permitted. If one label has a higher classification or includes all of the second label's compartments or both, the first label strictly dominates the second. Two labels are considered incomparable if neither label dominates the other.

MAC permits a subject to write up information and to read down information. In a read operation, the subject's sensitivity label must dominate the object's sensitivity label. This ensures that the subject's level of trust meets the requirements for access to the object and the subject's sensitivity label includes all compartment groupings that are allowed access to the object. In a write operation, the resulting object's sensitivity label must dominate the subject's sensitivity label. This prevents the subject from lowering the object's sensitivity label.

There are times when a security policy needs to be overridden. On conventional systems there is generally a single super-user account which has the ability to override all security policy. On a CMW system, the all powerful super-user authorization checks are replaced by individual checks for discrete privileges. Such a mechanism allows an administrator the ability to give a subject only those privileges that are required to perform its required task, and not give it complete override capability over the system's security policy.

U.S. Pat. No. 5,903,732 entitled "Trusted Gateway Agent For Web Server Programs", issued on May 11, 1999 and hereby incorporated by reference, discloses an invention incorporated into the Virtual Vault ("VV") product sold by Hewlett-Packard Company. This product relies primarily upon MAC and privilege to provide a secure runtime environment for arbitrary Internet aware applications. VV separates application components and assigns each component a unique sensitivity label. In general, an application is divided into three unique components:

1) A read only component with a low classification on the system. This is usually the application's configuration files, libraries and executables.
2) An Internet component. The sensitivity label of this component dominates the read only component and is incomparable to the Intranet component. This component usually consists of application subjects that handle requests from the Internet.
3) An Intranet component. The sensitivity label of this component dominates the read only component and is incomparable to the Internet component. This component usually consists of application subjects that access information from the Intranet.

The Internet and Intranet components have incomparable levels and cannot communicate with each other. A trusted mechanism (Trusted Gateway Agent—"TGA") provides for communication between subjects and objects at incomparable levels For example, the TGA mediates access between a web server (Internet component) and Common Gateway Interface (CGI) applications (Intranet component).

While traditional privileges and dedicated proxies can be used, they each suffer from their own particular problems. A subject that uses one of the CMW privileges has complete access to all other subjects and objects on the system, including subjects that have a dominate sensitivity labels and all subjects which have incomparable sensitivity labels. This privilege cannot restrict communications between specific components and thus is less secure. The use of dedicated proxies, while allowing finer grained access controls between components, is ill suited to the Internet environment where the number of deployed protocols is large and continues to grow. Developing a separate proxy for each protocol would be impractical.

It would be desirable to provide for granular access control of inter-process communications in a CMW environment. Provider access control overcomes the traditional privilege problem when a user with CMW privilege has complete access to all other subjects on the system while allowing for the deployment of single and multi-tier Internet applications without the explicit need for dedicated proxies.

It would be desirable and of considerable advantage to provide a secure operating system that differs from that employed in prior art MAC based CMW systems. Further, such a secure operating system could be advantageous when implemented by use of sensitivity labels comprised of security levels and compartments, especially if the new secure operating system restricts/prohibits the transfer of data between subjects and objects of differing security levels and the security levels are used to label all system subjects and objects including, but not limited to; network connections, -file system objects, processes, shared memory and message IPC.

It will be apparent from the foregoing that there is still a need to define arbitrary relationships between objects including but not limited to filesystem objects, shared memory/messages, TCP and tm so as to provide discrete access between subjects and objects having arbitrary, normally incomparable sensitivity labels.

BRIEF SUMMARY OF THE INVENTION

The present invention provides a method for maintaining a secure run-time operating system environment in which sensitivity labels are enforced such that the operating system restricts the transfer of data between subjects and objects of differing sensitivity labels where a sensitivity label must dominate or be considered incomparable to other sensitivity labels.

Arbitrary relationships between subjects and objects of differing sensitivity labels are defined wherein the secure operating system enforcement of sensitivity label dominance and the secure operating system prohibition of data transfer between incomparable sensitivity labels is extended to provide discrete access between arbitrary, normally incomparable sensitivity labels. Other aspects and advantages of the present invention will be come apparent from the following detailed description, taken in conjunction with the accompanying drawings, illustrating by way of example the principles of the invention.

DETAILED DESCRIPTION

Figure 1:
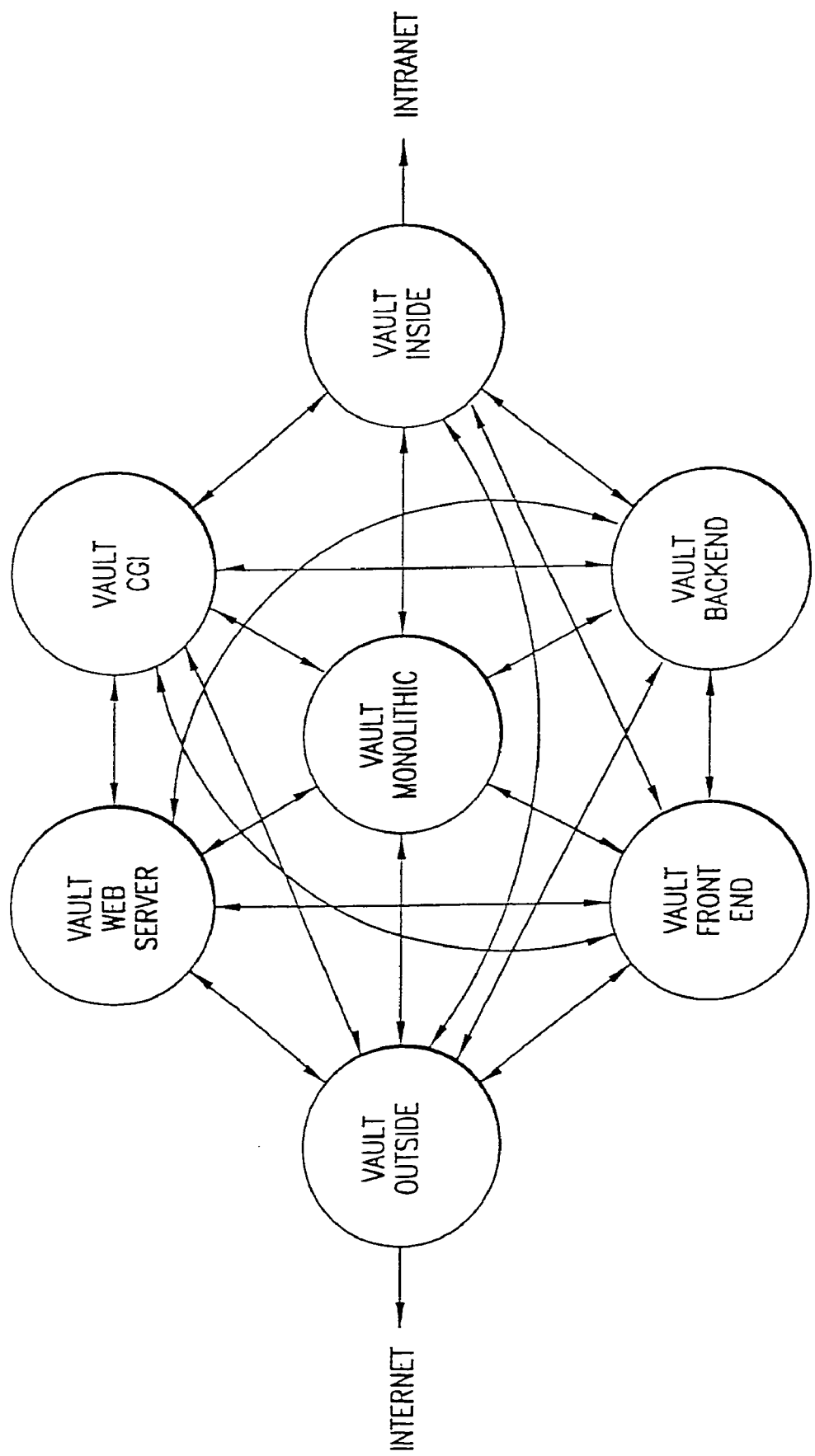
FIG. 1 is a block diagram illustrating the application of privileges to establish IPC channels.

It would be desirable to provide a flexible and configurable secure operating system run-time environment that allows MAC to be overridden for inter-process communications between subjects and objects having different sensitivity labels. In particular, when a prior art MAC based operating system encounters a request from an application process to establish an IPC channel, it will ensure that MAC will not be invalidated if the channel is established. Only if the subject making the request is privileged would the OS allow MAC to be overridden. Such application of privilege allows for the establishment of IPC channels as shown in FIG. 1 for traditional privileged processes.

The present invention employs a MAC based privilege with additional security checks employed to augment the authority of such privilege. When the secure OS in accordance with the invention encounters a request from an application process to establish an IPC channel, it will still ensure that MAC will not be invalidated if the channel is established. In particular, for MAC to be overridden and the IPC channel to be successfully instantiated the following three conditions must be met:

(1) The subject making the IPC request must be privileged.
(2) The subject or object that is the target of the request must be privileged.
(3) There must be a configured relationship between the sensitivity label of the requesting subject and the target subject or object.

Figure 2:
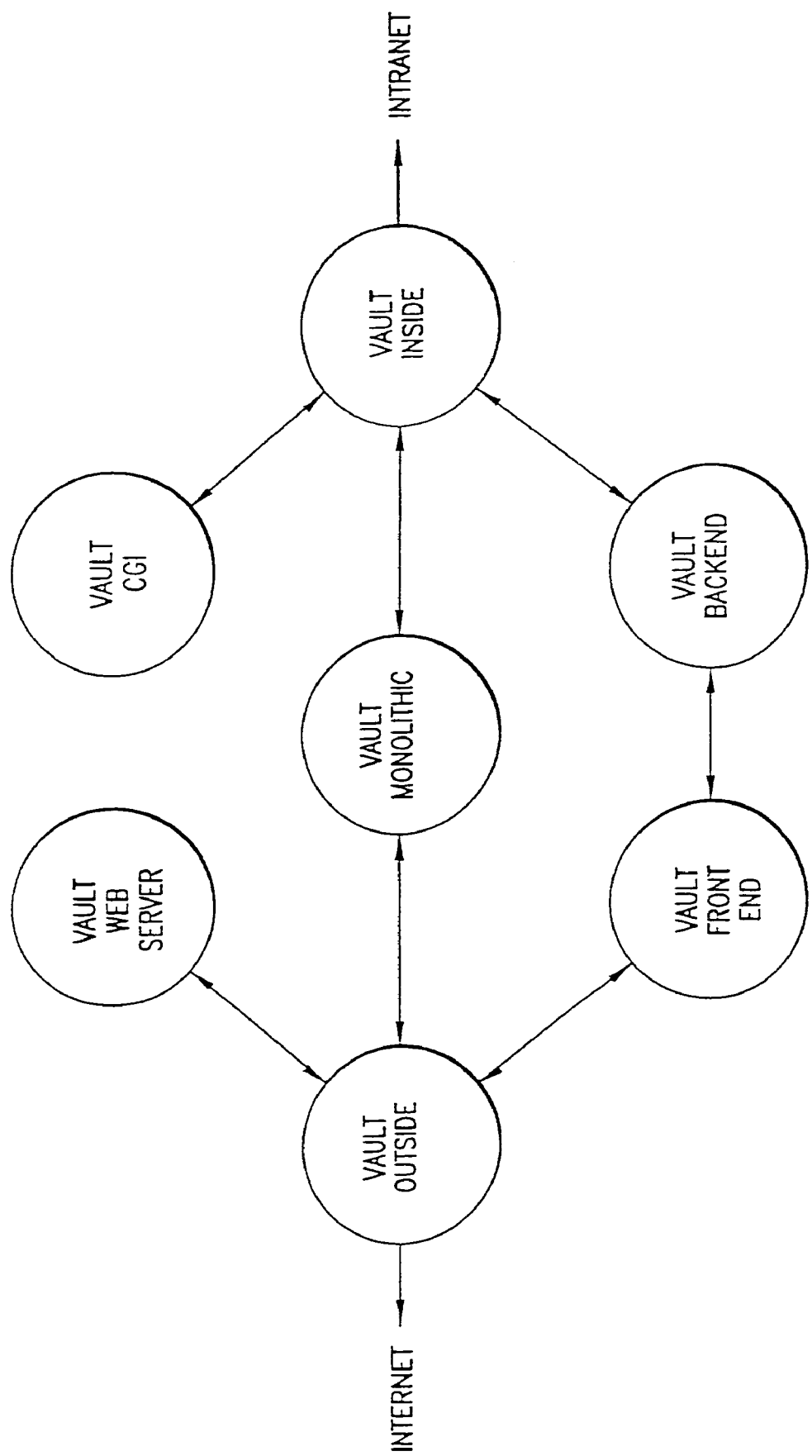
FIG. 2 is a block diagram illustrating the establishment of IPC channels between host machines having unique sensitivity labels.

Such application of privilege allows for the establishment of IPC channels as shown in FIG. 2. Through granular access control, this mechanism provides a secure run time environment for application processes that is more secure than traditional CMW systems. The invention provides that each network interface of the host machine is assigned a unique sensitivity label (VAULT OUTSIDE and VAULT INSIDE).

Figure 3:
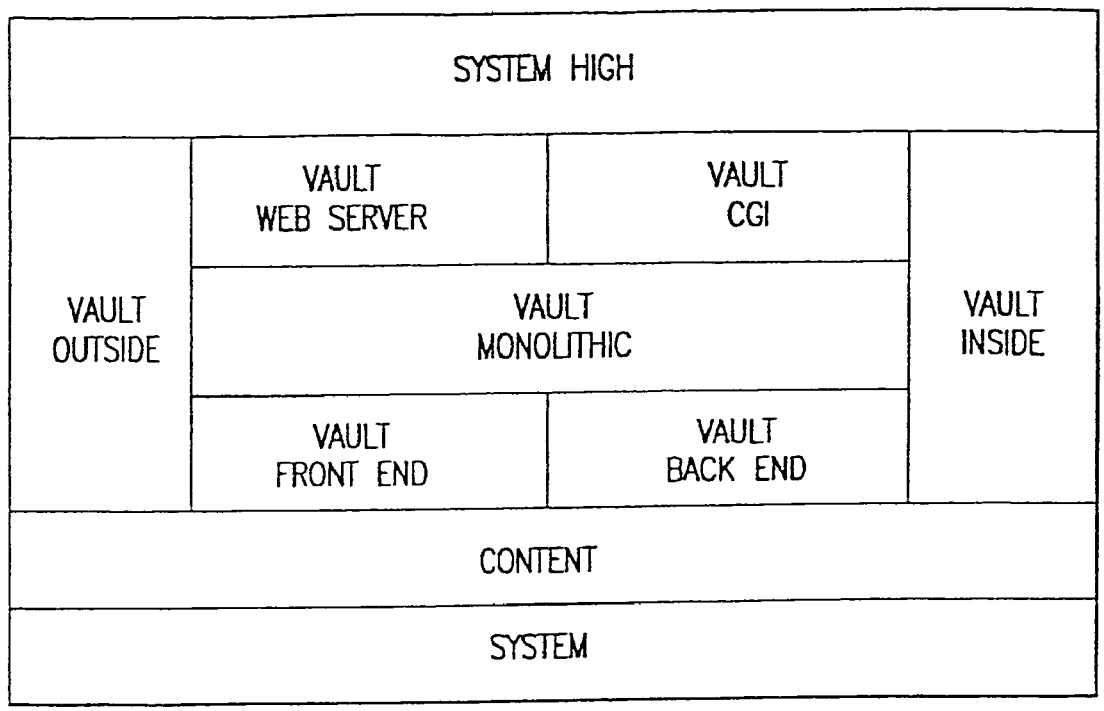
FIG. 3 is a block diagram of the data-partitioning format employed by the invention which employs a fixed set of classifications and a dynamic set of compartments.

As illustrated in FIG. 3, the invention provides a data-partitioning scheme having a fixed set of classifications and a dynamic set of compartments. This partitioning provides complete information separation between VV components, network interfaces, each application's content and every deployed application component. The set of classifications provides MAC separation between the VV files, the deployed application content files and the application processes. The SYSTEM classification provides a unique compartment to hold all operating system files and the read-only files of the VV layered components. The CONTENT classification holds all application deployed read-only data files. The VAULT classification is used to run all of the Internet applications and to hold any application deployed read-rite data files. These extra classifications provide for another layer of defense against undesirable modification of files and directories, and a more secure infrastructure for allowing multiple application integrations and content manipulation on a single machine.

Figure 4:
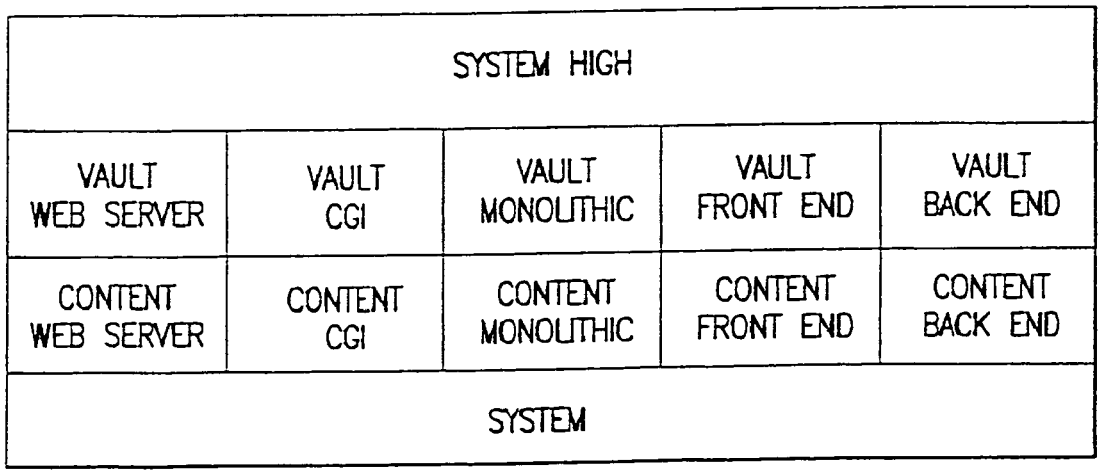
FIG. 4 is a block diagram illustrating the cross boundary IPC mechanism which mediates access between privileged processes at one sensitivity label with subjects and objects at another sensitivity label.
Figure 5:
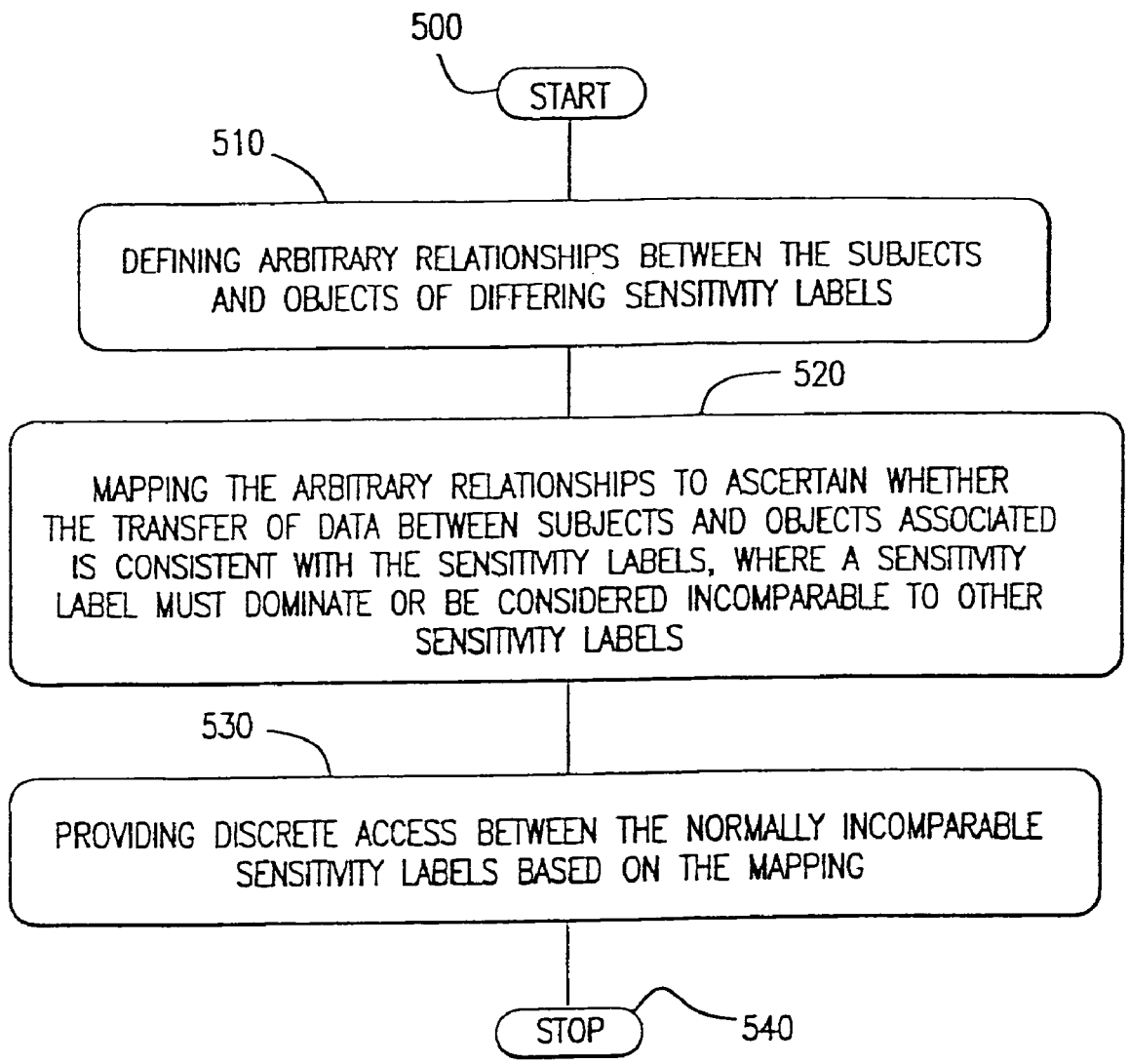
FIG. 5 is a flow chart illustrating the method steps of the claimed invention.

FIG. 4 illustrates the preferred embodiment of the invention having a flexible and configurable cross boundary IPC mechanism which mediates access between privileged processes at one sensitivity label with subjects and objects at another sensitivity label. These subjects and objects can be other privileged processes or network interfaces. This architecture isolates application components within their own compartments and provides for controlling access between components by mediating access between the compartments. For example, the invention provides for a privileged process within the VAULT WEB SERVER compartment access to the VAULT OUTSIDE network interface (FIG. 4). It also allows a privileged process within the CGI compartment access to the VAULT INSIDE network interface. The invention does not allow communications between a privileged process in the VAULT WEB SERVER compartment and a privileged process in the CGI compartment, for this inter-compartment mapping has not been configured. All of these cross-compartment communication relationships are configurable. Thus, the invention provides for a unique combination of a multi-classification, multi-compartment VV that uses a novel security mechanism to provide a secure deployment framework for a wide variety of Internet application architectures.

Mapping defines the allowed communications channels between privileged and non-privileged processes that do not possess the same sensitivity label. The ability to separately map individual processes with or without communication privilege and their communication mapping attributes is provided within each compartment. Therefore, a compartment to compartment communications mapping can be configured to perform an effective privilege access check by mapping attributes "with privilege" and to bypass the access check by mapping attributes "without privilege".

Mapping is employed for defining arbitrary relationships between subjects and objects having different sensitivity labels. Once provided, discrete access between these arbitrary, normally incomparable sensitivity labels is enabled. In the preferred embodiment of the invention, basic mapping employs the arrow "→" to represent data flow (for file mapping operations only). In addition to data flow, a mapping can be restricted. A restricted mapping requires the process to have a privilege. If a "P" is attached to the "→", then the process using the mapping must hold a special privilege to use the mapping. For example, the mapping:

system outside (rc) P→system inside dictates that a system outside labeled process may connect to a system inside process/object or open for reading a system inside object, but it must hold a privilege to do so. Take away the "P", and any system outside process can use the mapping. For example, the mapping of an outside network interface to an outside server process setup as safeclient and safeserver (Where safeclient is synonymous with (Send(UDP), Connect(TCP) and safeserver is synonymous with (Accept(TCP), Receive(UDP) in communications between compartments):

System Outside(A) P→Outside NIC
Outside NIC(C) P→System Outside

Another example of this mapping would be a mapping of an outside network interface to an outside server process setup with safeserver only:

System Outside(A) P→Outside NIC
Outside NIC(C)→System Outside

The following mapping examples (without privilege mappings) illustrates the format of a valid mappings section where the attributes are the operations that the subjects on the left: side of the →can do to the objects on the right side. The attributes are set up as a Policy file within the operating system and include:

a—accept (TCP)
c—connect (TCP)
r—read
w—write
s—send (UDP)
r—receive (UDP)

Additional mappings include:
System Outside(attributes→Vault Web Server
Vault Web CGI (attributes)→Vault Inside_NIC
System Outside(attributes)→Vault App Front End
Vault App Front End(attributes)→Vault App Back End
Vault App Back End(attributes)→Vault Inside_NIC Alternatively, numeric mappings may be employed:
101(attributes)→102
104(attributes)→100
101(attributes)→106
106(attributes)→107
107(attributes)→100

Whenever the MAC daemon within a secure operating system reads and activates the contents of the Policy file, this simple decision list is loaded into the kernel and held in an existing communications decision cache. Keeping this information in the kernel eliminates the need to consult the MAC policy daemon for communications decisions.

The invention also provides for IPC mechanisms (message queues, semaphores and shared memory) restriction to the local machine and that they are free from any network interface complications. Each of these mechanisms use a similar API to both create a new IPC mechanism and to utilize an existing IPC mechanism. If a process uses one of the IPC APIs to create a new communications channel (msgget( ), semget( ) or shmget( ) and has the safeserver privilege in its effective set, then the newly created IPC channel is marked that it was created by a safe server application. (Where safeclient is synonymous with (Send (UDP), Connect(TCP) and safeserver is synonymous with (Accept(TCP), Receive(UDP) in communications between compartments). The difference occurs when a client program attempts to connect to an existing IPC channel with a different sensitivity label. In the context of the invention, the IPC channel will be established if one the following conditions are met:

The attribute (safeclient or safeserver) controls are mapped with privilege (P→) and the access check for effective privilege by the system is successful.

The attribute (safeclient or safeserver) controls are mapped without privilege (→).

The attribute Accept or Receive control is mapped and the appropriate network privilege access check is successful.

Communications within the invention can be bi-directional if one of the following conditions are met:

The attribute (safeclient or safeserver) controls are mapped in both directions between compartments with privilege (P→) and the access check for effective privilege by the system is successful.

The attribute (safeclient or safeserver) controls are mapped in both directions between compartments without privilege (→).

The attribute Accept or Receive control is mapped in both directions and the appropriate network privilege access check is successful.

The invention can be configured in a compatibility mode by performing a bi-directional mapping of safeclient and safeserver controls between the OUTSIDE and INSIDE compartments with privilege. For illustrative purposes, the "vault app front end(C) P→vault app back end" and the reciprocal "vault app back end (A)P→vault app front end" mapping defined in the above example are employed. A process with the safeclient privilege and a sensitivity label of Vault Front End can connect to a System V IPC channel created by a process with the safeserver privilege and a sensitivity label of Vault Back End.

The TCP(accept and connect) and UDP(send and receive) IPC mechanisms operate in the same way when the client and server reside on the same machine, but are modified if a network interface is involved. The architecture employed by the invention defines that network interfaces are implicitly unprivileged which means that they do not hold the safeserver and safeclient privileges as a default. This implies that network interfaces cannot connect or send to a processes unless explicitly given safeclient privilege or granted privilege by the new mappings. The implied privileges require some special consideration of data that arrives or attempts to leave the machine.

Where the network interface connected to the Internet has been labeled Vault Outside_NIC and the network interface connected to a corporate Intranet has been labeled Vault Inside_NIC, and TCP and a server process, which has a sensitivity label of Vault Web Server, the process creates a socket, binds it to a network port, and begins to listen for incoming connections. At some point, the process will have to call accept( ) to accept an incoming connection. If the incoming connection request is from a network interface, there must exist a mapping between the label of the network interface and the label of the process, Based on the supplied "vault web server(A)→vault outside_nic" mapping, the process under scrutiny could accept connections from the Internet but not from the Intranet, since no mapping has been defined for the later case. This is still a one way street as the mapping specifies a specific direction. Even if the server process held the safeclient privilege, there is no mapping from Vault Web Server to Vault Outside_NIC.

As another example, a process that has a sensitivity label of Vault Web CGI and holds the safeclient privilege attempts to make a connection to a remote machine on the Intranet. Since the connection would utilize the network interface with the Vault Inside_NIC sensitivity label, the "vault web CGI(C) P→vault inside_nic", and a reciprocal "vault inside_nic(A) P→vault web CGI" mapping, must exist for this connection request to continue. Since the mapping is defined, connect filtering would allow the connection request to continue.

While the invention has been described and illustrated with reference to specific embodiments employing a UNIX based CMW (Compartment Mode Workstation), those skilled in the art will recognize that modification and variations may be made such that the invention is equally applicable to other secure Web platforms and most compatible hardware that provide for defining arbitrary relationships between subjects and objects of differing sensitivity levels.

What is claimed is:

1. A method for maintaining a secure operating system run-time environment comprising:
designating sensitivity labels associated with subjects and objects such that each sensitivity label either dominates, is dominated by, or is incomparable to each other sensitivity label;
defining in a policy file arbitrary relationships between the subjects and objects of differing sensitivity labels; and
enforcing sensitivity labels by the operating system such that the operating system restricts the transfer of data between subjects and objects associated with inconsistent sensitivity labels except as permitted by said relationships defined in said policy file, thereby providing discrete access between arbitrary, incomparable sensitivity labels.

2. The method for maintaining a secure run-time environment as claimed in claim 1, wherein defining arbitrary relationships between the subjects and objects of differing sensitivity labels comprises:
labeling with sensitivity labels, all subjects and objects including, but not limited to: network connections, file system objects, processes, shared memory, and message Inter-Process Communications (IPC).

3. The method for maintaining a secure run-time environment as claimed in claim 2, wherein labeling all subjects and objects comprises listing within an encoding file a non-ambiguous sensitivity label consisting of a tag value and a label definition.

4. The method for maintaining a secure run-time environment as claimed in claim 3, wherein listing within an encoding file comprises defining hierarchical classifications of the operating system.

5. The method for maintaining a secure run-time environment as claimed in claim 3, further comprising:
providing for IPC mechanisms restriction if one of the following conditions are met:
attribute controls are mapped with privilege and an access check for effective privilege by the operating system is successful; or
attribute controls are mapped without privilege; or
an attribute Accept or Receive control is mapped and an appropriate network privilege access check is successful.

6. The method for maintaining a secure run-time environment as claimed in claim 5, wherein the IPC mechanisms comprise one or more of message queues, semaphores and shared memory.

7. The method for maintaining a secure run-time environment as claimed in claim 6, wherein an IPC channel is established if one of the following conditions are met:
the attribute controls are mapped in both directions between compartments with privilege and the access check for effective privilege by the system is successful;
the attribute controls are mapped in both directions between compartments without privilege; or
the attribute Accept or Receive control is mapped in both directions and the appropriate network privilege access check is successful.

8. The method for maintaining a secure run-time environment as claimed in claim 1, wherein defining arbitrary relationships between the subjects and objects of differing sensitivity labels comprises associating with a subject a first, arbitrary sensitivity label, associating with an object a second, arbitrary and incomparable sensitivity label, and mapping a relationship to define access between the subject and object.

9. The method for maintaining a secure run-time environment as claimed in claim 8, wherein mapping comprises:
providing discrete mandatory access control based separation between compartments that hold network interfaces and compartments that hold application processes; and
ascertaining which labels currently exist in the system at the time of a verification request as well as any labels that are scheduled to be activated at the next reboot.

10. The method for maintaining a secure run-time environment as claimed in claim 9, further comprising committing user defined configurations and verifying if the labels and controls are in effect at the time of the commit or at a next reboot, wherein the verify and commit operations return values or messages that report success and failure conditions.

11. The method for maintaining a secure run-time environment as claimed in claim 10, wherein committing user defined configurations comprises:
 interfacing with an encodings file and with compartment mapping information on a real-time basis;
 committing label creation and retirement or disablement operations,
 mapping file and communications operations; and
 verifying label creation and retirement or disablement operations to verify the file and communications mappings.

12. A secure operating system in which sensitivity labels, each comprised of a security level and one or more compartments, are enforced such that the operating system restricts the transfer of data between subjects and objects of differing sensitivity labels where a sensitivity label must dominate or be considered incomparable to other sensitivity labels comprising:
 a label encodings file comprising:
  a classification section to define the hierarchical names of the system in which classifications are ranked hierarchically according to an assigned level from lower to higher, wherein the higher classifications dominate the lower classifications,
  a compartment section to define subdivisions of data possible within a classification,
  a label section to define valid labels and their tag values, and
  a communications section defining allowed communications channels between privileged and non-privileged processes that do not possess the same sensitivity label, wherein one or more channels are arbitrarily defined.

13. A secure operating system as claimed in claim 12, further comprising means for committing user defined configurations and verifying if labels and controls are in effect at a time of a commit or at a next reboot, wherein the verify and commit operations return values and messages that report success and failure conditions.

14. A secure operating system as claimed in claim 12, further comprising a network communications filter for providing TCP and UDP mapping between objects and subjects based on effective privilege, Mandatory Access Control (MAC) equivalence, mappings assigned between compartments.

15. A secure operating system as claimed in claim 14, wherein each of the mappings is with or without privilege.

16. A secure operating system as claimed in claim 12, the label encodings file further comprising:
 a mapping section that governs IPC and file control mappings, wherein the communications section is operable such that a compartment to compartment communications mapping can be configured to perform an effective privilege access check by mapping attributes "with privilege" and to bypass the access check by mapping attributes "without privilege".

17. A secure operating system as claimed in claim 16, the communications section validating mapping without privilege as follows:
 System Outside (attributes)→ Vault Web Server
 Vault Web CGI (attributes)→ Vault Inside_NIC
 System Outside (attributes)→ Vault App Front End
 Vault App Front End (attributes)→ Vault App Back End
 Vault App Back End (attributes)→ Vault Inside_NIC,
 and further comprising a communications decision cache, wherein whenever a MAC daemon reads and activates contents of the label encodings file, a decision list is loaded into a kernel and held in the communications decision cache.

18. A secure operating system as claimed in claim 12, wherein an entry specifies two valid sensitivity labels separated by a reserved token, → (without privilege) or "P→"(with privilege), and wherein each of the valid sensitivity labels specified may be represented by either a tag value associated with the label or an ASCII external representation of the label.

19. A secure operating system as claimed in claim 12, further comprising:
 a configuration section with an additional check for allowed compartment communications and file access controls, wherein the configuration section is included in the encodings file and governs an additional check, and extensions to a MAC daemon load a configuration from the configuration section into a kernel decision cache, and an additional kernel Application Program Interface (API) is added to consult the decision cache.

20. A secure operating system as claimed in claim 12, the label section further comprising means for defining the valid labels of the system and their corresponding tag values as label entries, wherein each label entry comprises a tag value and a label definition, and wherein each defined label begins with a valid classification name.

21. A secure operating system as claimed in claim 20, wherein a classification name is followed by one or more compartment names.

22. A secure operating system as claimed in claim 12, the label section further comprising the following valid labels:
 CMW_Compatible,
 100: Vault Inside_NIC,
 101: Vault Outside NIC,
 102: Content Web Server,
 103: Vault Web CGI,
 104: Content Web CGI,
 105: Content Web CGI,
 106: Vault App Front End App Data,
 107: Vault App Back End App Data,
 108: Content App Data, and
 109: RESERVED Content App Rdata.

23. A secure operating system as claimed in claim 12, further comprising means for determining labels that currently exist in the system at the time of a verification request as well as any labels that are scheduled to be activated at the next reboot.

24. A method for providing discrete access control between entities associated with sensitivity labels, each label comprising both a classification level component and a compartment component, comprising:
 defining a fixed set of classifications for each entity;
 defining a dynamic set of compartments for each entity;
 partitioning application process entities and network interface entities into unique compartments;
 configuring, in a file, access relationships between entities having different sensitivity labels, wherein said configuring comprises configuring at least one access relationship between entities having incomparable sensitivity labels: and enforcing sensitivity labels by an operating system such that transfer of data between entities associated with incomparable sensitivity labels is restricted except for said at least one access relationship configured in said file.

25. The method for discrete access control as claimed in claim 24, wherein the configuring is performed by a user.

26. The method for providing discrete access control as claimed in claim 24, further comprising mediating attempted security-related transactions by comparing a first sensitivity label associated with a first entity and a second sensitivity label associated with a second entity and permitting or disallowing a transaction based upon label dominance and the configured relationships.

27. The method for providing discrete access control as claimed in claim 24, wherein defining a dynamic set of compartments for each entity creates complete information separation between Virtual Vault components, network interfaces, application content, and deployed application components.

28. The method for providing discrete access control as claimed in claim 24 further comprising providing Mandatory Access Control separation between compartments that hold network interface entities and compartments that hold application process entities.

29. The method for providing discrete access control as claimed in claim 28, wherein providing Mandatory Access Control separation between compartments that hold network interface entities and compartments that hold application process entities comprises providing discrete access controls between vanilla applications and critical network interface resources.

30. A method comprising:

designating sensitivity labels associated with subjects and objects such that each sensitivity label either dominates, is dominated by, or is incomparable to each other sensitivity label;

defining in a policy file a mapping of allowed communications between subjects and objects associated with different sensitivity labels, wherein said mapping supports mapping with privilege and mapping without privilege; and enforcing sensitivity labels by the operating system such that the operating system restricts communications between subjects and objects associated with inconsistent sensitivity labels except as permitted by said mapping.

31. The method of claim 30 wherein based on said mapping, the operating system permits discrete access between subjects and objects associated with incomparable sensitivity labels.

32. The method of claim 30 wherein for any mapping with privilege of allowed communications between a subject and object with different sensitivity labels, said operating system restricts said communication unless said subject holds a defined privilege.

33. The method of claim 30 wherein for any mapping without privilege of allowed communications between a subject and object with different sensitivity labels, said operating system does not require said subject to hold a defined privilege to perform said communication.

* * * * *

UNITED STATES PATENT AND TRADEMARK OFFICE
CERTIFICATE OF CORRECTION

PATENT NO. : 7,062,780 B2  
APPLICATION NO. : 10/765621  
DATED : June 13, 2006  
INVENTOR(S) : Scott Alan Leerssen et al.

It is certified that error appears in the above-identified patent and that said Letters Patent is hereby corrected as shown below:

In column 10, line 12, in Claim 18, after "token," delete "→" and insert -- "→" --, therefor.

In column 10, line 67, in Claim 24, delete "labels:" and insert -- labels; --, therefor.

Signed and Sealed this

Twenty-eighth Day of July, 2009

JOHN DOLL  
*Acting Director of the United States Patent and Trademark Office*